(12) United States Patent
Kim

(10) Patent No.: US 10,343,483 B2
(45) Date of Patent: Jul. 9, 2019

(54) HEAT PUMP SYSTEM FOR VEHICLE

(71) Applicants: HYUNDAI MOTOR COMPANY, Seoul (KR); KIA MOTORS CORPORATION, Seoul (KR)

(72) Inventor: Jae Yeon Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/808,118

(22) Filed: Nov. 9, 2017

(65) Prior Publication Data

US 2019/0047352 A1 Feb. 14, 2019

(30) Foreign Application Priority Data

Aug. 9, 2017 (KR) .................. 10-2017-0100982

(51) Int. Cl.
 B60H 1/00 (2006.01)
(52) U.S. Cl.
 CPC ..... B60H 1/00278 (2013.01); B60H 1/00385 (2013.01); B60H 1/00899 (2013.01); *B60H 2001/00307* (2013.01); *B60H 2001/00928* (2013.01); *B60H 2001/00957* (2013.01)
(58) Field of Classification Search
 CPC ............ B60H 1/00278; B60H 1/00899; B60H 2001/00928; B60H 2001/00957; B60H 2001/00307
 See application file for complete search history.

(56) References Cited

U.S. PATENT DOCUMENTS

| 6,230,508 B1 | 5/2001 | Baker et al. |
| 8,517,087 B2 | 8/2013 | Zeigler et al. |
| 2012/0153718 A1* | 6/2012 | Rawlinson ............... H02K 5/20 307/10.1 |

(Continued)

FOREIGN PATENT DOCUMENTS

KR  10-2012-0014621 A   2/2012

OTHER PUBLICATIONS

"Secondary loop and heat pump climate control under evaluation once more," SAE International, Nov. 14, 2016, pp. 1 and 2.

(Continued)

*Primary Examiner* — Kun Kai Ma
(74) *Attorney, Agent, or Firm* — Morgan Lewis & Bockius LLP

(57) ABSTRACT

A heat pump system for vehicle includes a cooling device including a radiator and a first water pump by a cooling line and circulating a coolant along the cooling line to cool an electric component; a battery module provided on a battery cooling line selectively connected to the cooling line through a first valve; a HVAC module including an internal heater connected to the cooling line through a first connection line, a cooler connected to the battery cooling line through a second connection line, and an opening or closing door provided between the internal heater and the cooler and controlling external air passing through the cooler to be selectively introduced into the internal heater depending on cooling, heating, and heating and dehumidifying modes of the vehicle; and a centralized energy (CE) module connected to each of the battery cooling line and the cooling line.

20 Claims, 8 Drawing Sheets

(56) References Cited

U.S. PATENT DOCUMENTS

| | | | | |
|---|---|---|---|---|
| 2012/0222846 | A1* | 9/2012 | Kadle | F28D 9/005 |
| | | | | 165/166 |
| 2016/0031288 | A1* | 2/2016 | Nishikawa | F01P 3/20 |
| | | | | 165/202 |
| 2016/0107508 | A1* | 4/2016 | Johnston | B60H 1/00278 |
| | | | | 165/202 |
| 2016/0159204 | A1* | 6/2016 | Katoh | B60H 1/3211 |
| | | | | 62/185 |
| 2017/0054188 | A1* | 2/2017 | Blatchley | H01M 10/663 |
| 2017/0106725 | A1* | 4/2017 | Kim | B60H 1/00428 |
| 2017/0197490 | A1* | 7/2017 | Enomoto | F25B 1/00 |
| 2018/0111499 | A1* | 4/2018 | Wada | H01M 10/625 |
| 2018/0264913 | A1* | 9/2018 | Enomoto | B60H 1/00899 |
| 2018/0312034 | A1* | 11/2018 | Koberstein | B60H 1/00899 |

OTHER PUBLICATIONS

M. Eisele, et al., "Experimental Cooling and Energy Performance of Motor Vehicle ACUsing HFC-152A," Center for Environmental Energy Engineering, pp. 1-25.
Q. Peng, et al., "Progress in Heat Pump Air Conditioning Systems for Electric Vehicles—A Review," Energies, 2016, vol. 9, No. 240, pp. 1-17.
K. Wang, et at, "Review of secondary loop refrigeration systems," International Journal of Refrigeration, vol. 33, 2010, pp. 212-234.
Stephen O. Andersen, et al., "EPA Supports Innovation," R-152a Mobile A/C System, Scottsdale, AZ, 2002.

* cited by examiner

HEAT PUMP SYSTEM FOR VEHICLE

CROSS-REFERENCE TO RELATED APPLICATION

This application is based on and claims the benefit of priority to Korean Patent Application No. 10-2017-0100982 filed on Aug. 9, 2017 with the Korean Intellectual Property Office, the entire contents of which are incorporated herein by reference.

TECHNICAL FIELD

The present disclosure relates to a heat pump system for a vehicle. More particularly, the present disclosure relates to a heat pump system for a vehicle for cooling or heating an interior of the vehicle by respectively and selectively using a coolant of high-temperature and the coolant of low temperature.

BACKGROUND

An air conditioner for a vehicle generally refers to an air conditioning device circulating a refrigerant in order to heat or cool an interior of the vehicle.

The air conditioning device, which is to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Recently, in accordance with a continuous increase in an interest in energy efficiency and an environmental pollution problem, the development of an environmentally-friendly vehicle capable of substantially substituting for an internal combustion engine vehicle has been demanded, and the environmentally-friendly vehicle is generally classified into an electric vehicle driven using an fuel cell or electricity as a power source and a hybrid vehicle driven using an engine and a battery.

In the electric vehicle or the hybrid vehicle among these environmentally-friendly vehicles, a separate heater is not used unlike an air conditioner of the internal combustion engine vehicle, and an air conditioner used in the environmentally-friendly vehicle is generally called a heat pump system.

The electric vehicle generates driving force by converting chemical reaction energy between oxygen and hydrogen into electric energy. In this process, heat energy is generated by a chemical reaction in a fuel cell. Therefore, it is necessary to effectively remove generated heat for securing performance of the fuel cell.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling device, a heat pump system, and a battery cooling system should be configured using separate closed circuits, respectively, so as to prevent heat generation of the motor, an electric component, and the battery including the fuel cells.

Accordingly, a size and a weight of a cooling module disposed at the front of the vehicle are increased inevitably, and a layout of connection pipes supplying a coolant or a refrigerant to each of the heat pump system, the cooling device, and the battery cooling system in an engine compartment becomes complicated.

In addition, since the battery cooling system warming up or cooling the battery depending on a state of the vehicle is separately provided so that the battery exhibits optimal performance, a plurality of valves for connecting the respective connection pipes to each other are used, and noise and vibrations due to frequent opening or closing operations of these valves are generated and transferred to the interior of the vehicle, thereby deteriorating a ride comfort.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a heat pump system for a vehicle having advantages of selectively heat-exchanging thermal energy generated from a refrigerant at the time of condensing or evaporating the refrigerant with a coolant, and controlling an interior temperature of the vehicle using a low-temperature coolant or a high-temperature coolant of which heat exchanged.

Further, the present disclosure has been made in an effort to provide a heat pump system for a vehicle having advantages of improving heating efficiency of the vehicle using waste heat of an electric component and a battery module and increasing an entire travel distance of the vehicle by efficiently controlling a temperature of the battery module so that the battery module exhibits optimal performance.

A heat pump system for vehicle according to an exemplary embodiment of the present disclosure includes a cooling device including a radiator and a first water pump by a cooling line and circulating a coolant along the cooling line to cool an electric component; a battery module provided on a battery cooling line selectively connected to the cooling line through a first valve; a heating, ventilation, and air conditioning (HVAC) module including an internal heater connected to the cooling line through a first connection line, a cooler connected to the battery cooling line through a second connection line, and an opening or closing door provided between the internal heater and the cooler and controlling external air passing through the cooler to be selectively introduced into the internal heater depending on cooling, heating, and heating and dehumidifying modes of the vehicle; and a centralized energy (CE) module connected to each of the battery cooling line and the cooling line, exchanging thermal energy generated at the time of condensing and evaporating a refrigerant circulated therein with heat of a coolant, and supplying a low-temperature or high-temperature coolant of which the heat is exchanged to the HVAC module, wherein the CE module is further provided with a sub condenser in which the coolant and the refrigerant secondarily exchange heat to increase a condensing amount through a sub-cool increasing of the refrigerant and a sub heat exchanger in which the low-temperature refrigerant and the condensed refrigerant exchange heat to secondarily condense refrigerant.

The CE module may include a condenser provided on the cooling lines connected to each other through a second valve provided on the cooling line between the radiator and the battery module and a third valve provided on the cooling line between the electric component and the first valve; a receiver drier provided between the condenser and the sub condenser; a expansion valve connected to the sub heat exchanger, connected to the sub condenser through a refrigerant line, through the refrigerant line; an evaporator connected to the expansion valve through the refrigerant line and provided on the battery cooling line between the battery module and the first valve; and a compressor provided on the refrigerant line between the evaporator and the condenser, the sub condenser connected to the receiver drier through the refrigerant line is provided on the cooling line connected to the condenser, and the refrigerant exhausted from the evaporator exchanges heat with the refrigerant supplied from the sub condenser while passing through the sub heat exchanger, and then is supplied to the compressor.

The first valve may connect the cooling line connected to the electric component between the radiator and the evaporator, and the battery cooling line, and the first connection line may selectively connect the cooling line and the internal heater through the second valve and the third valve.

The battery cooling line may be provided with a first branch line connecting the evaporator and the battery module through the first valve, the second connection line may be connected to the battery cooling line through a fourth valve between the evaporator and the battery module connected through the first branch line, the cooling line connecting between the electric component and the radiator may be provided with a second branch line connected to the cooling line between the radiator and the first water pump through a fifth valve, a third branch line branching the battery cooling line through a sixth valve may be provided to control a supply of the refrigerant to the battery module between the evaporator and the battery module, the battery cooling line passing through the battery module may be provided with a first battery heating line connected to the first connection line through a seventh valve provided at a rear of the battery module with respect to a flow direction of the coolant, and the battery cooling line passing through the battery module may be provided with a second battery heating line connected to the first connection line at a front of the battery module with respect to the flow direction of the coolant and having an eighth valve.

In the case of cooling the electric component in the cooling mode of the vehicle, the first branch line may be opened through an operation of the first valve and the second connection line is opened in a state in which the battery cooling line connected to the battery module is closed through an operation of the fourth valve, the first connection line may be closed and the cooling line connecting the electric component and the condenser to each other is opened, through operations of the second and third valves, the connection between the cooling line and the battery cooling line may be closed through operations of the first to third valves, the cooling line connecting the electric component and the radiator to each other may be opened in a state in which the second branch line is closed through an operation of the fifth valve, the third branch line may be closed through the operation of the sixth valve, the first and second battery heating lines may be closed through the seventh and eighth valves, and the refrigerant may be circulated in the CE module.

The evaporator may cool the coolant circulated along the battery cooling line in the cooling mode of the vehicle with a low-temperature refrigerant evaporated therein through a heat exchange and may supply a low-temperature coolant to the cooler through the second connection line.

In a case cooling the battery module along with the electric component in a cooling mode of the vehicle, the battery cooling line connected to the battery module may be opened through the operation of the fourth valve, and the first and second battery heating line may be closed through the operation of the seventh valve and the eighth valve.

In a case increasing a temperature of the battery module in a cooling mode of the vehicle, the cooling line connecting the electric component and the condenser to each other and the first connection line may be opened through operations of the second and third valves, the first and second battery heating lines may be opened through the operation of the seventh and eighth valves, and the battery cooling line connected to the battery module may be connected to the first connection line through the opened first and second battery heating lines.

In a case recovering a waste heat of the battery module and the electric component in a heating mode of the vehicle, the first branch line may be closed through an operation of the first valve and the second connection line is closed in a state in which the battery cooling line connected to the battery module is opened through an operation of the fourth valve, the cooling line connecting the electric component and the condenser to each other and the first connection line may be opened through operations of the second and third valves, the cooling line may be connected to the battery cooling line through operations of the first to third valves, the cooling line connecting the electric component and the radiator to each other may be closed in a state in which the second branch line is opened through an operation of the fifth valve, the third branch line may be closed through the operation of the sixth valve, the first and second battery heating lines may be closed through the operation of the seventh valve and the eighth valve, and the refrigerant may be circulated in the CE module.

The waste heat generated in the electric component and the battery module may raise a temperature of a coolant circulated along the cooling line and the battery cooling line, and the coolant of which the temperature may be raised raises a temperature of a refrigerant exhausted from the evaporator.

In the case of recovering the waste heat from only the battery module in the heating mode of the vehicle, the first branch line may be opened through an operation of the first valve, and the connection between the cooling line and the battery cooling line may be closed through operations of the first to third valves.

In a case increasing a temperature of the battery module in a heating mode of the vehicle, the first branch line may be closed through the operation of the first valve, and the battery cooling line connected to the battery module and the second connection line may be closed through the operation of the fourth valve, the cooling line and the first connection line connecting the electric component, and the condenser and the sub condenser are opened through the operation of the second and third valves, the cooling line may be connected to the battery cooling line through the operation of the first, second, and third valves, the cooling line connecting the electric component and the radiator may be closed in a state that the second branch line is opened through the operation of the fifth valve, the third branch line may be opened through the operation of the sixth valve such that the cooling line and the battery cooling line are connected, the refrigerant may be circulated in the CE module, the first and second battery heating lines may be opened through the operation of the seventh and eighth valves, and the battery cooling line connected to the battery module may be connected to the first connection line through the opened first and second battery heating lines.

In the heating and dehumidifying mode of the vehicle, the first branch line may be opened through an operation of the first valve and the second connection line is opened in a state in which the battery cooling line connected to the battery module is closed through an operation of the fourth valve, the cooling line connecting the electric component and the condenser to each other and the first connection line may be opened through operations of the second and third valves, the connection of the cooling line connected to the electric component and the battery cooling line may be closed through the operation of the first, second and third valves in a state that the operation of the first water pump is stopped, the second and third branch lines may be closed through the operation of the fifth and sixth valves, the first and second battery heating lines may be closed through the operation of the seventh valve and the eighth valve, and the refrigerant may be circulated in the CE module.

In a case increasing the temperature of the battery module in the heating and dehumidifying mode of the vehicle, the first branch line may be opened through an operation of the first valve and the second connection line may be opened in a state in which the battery cooling line connected to the battery module is closed through an operation of the fourth valve, the cooling line and the first connection line connecting the condenser and the sub condenser may be opened through the operation of the second and third valves, the connection of the cooling line connected to the electric component and the battery cooling line may be closed through the operation of the first, second and third valves in a state that the operation of the first water pump is stopped, the second and third branch lines may be closed through the operation of the fifth and sixth valves, the first and second battery heating lines may be opened through the operation of the seventh and eighth valves, the battery cooling line connected to the battery module may be connected to the first connection line through the opened first and second battery heating line, and the refrigerant may be circulated in the CE module.

In a case increasing a temperature of the battery module in a state that a cooling or heating mode of the vehicle, the circulation of the refrigerant may be stopped in the CE module, the first branch line may be connected to the battery cooling line and the connection with the cooling line is closed through operation of the first valve, the battery cooling line passing through the battery module may be opened through the operation of the fourth valve, the second and third branch lines may be closed through the operation of the fifth and sixth valves, and the first and second battery heating lines may be closed through the operation of the seventh valve and the eighth valve.

A heater may be provided in the battery cooling line between the battery module and the evaporator, and the heater may be operated to be turned on so that the coolant circulated along the battery cooling line is heated to be introduced to the battery module.

A reservoir tank connected to the second branch line may be provided between the radiator and the first water pump.

The condenser, the sub condenser, and the evaporator may be a water cooling type heat exchanger in which the coolant is introduced inside through the cooling line and the battery cooling line.

The refrigerant circulated in the CE module may be a R152-a or R744 refrigerant.

A second water pump may be provided in the battery cooling line, and a third water pump may be provided in the first connection line.

The electric component may be a motor, an electric power control unit (EPCU) and on board charger (OBC), the motor and the electric power control unit may be heated while driving, and the on board charger may be heated while charging the battery module.

The second and third valves may be a 4-way valve, the first, fourth, fifth, sixth and seventh valves may be a 3-way valve, and the eighth valve may be a 2-way valve.

As above-described, according to the heat pump system for the vehicle according to an exemplary embodiment of the present disclosure, the thermal energy generated from the refrigerant at the time of condensing or evaporating the refrigerant is heat-exchanged with the coolant, and an interior temperature of the vehicle is controlled using the low-temperature or high-temperature coolant of which heat exchanged, thereby making it possible to simplify the heat pump system for a vehicle and simplify a layout of connection pipes through which the refrigerant is circulated.

In addition, the heat pump system for a vehicle may improve heating efficiency of the vehicle using the waste heat of the electric component and the battery module, and may increase an entire travel distance of the vehicle by efficiently controlling the temperature of the battery module so that the battery module exhibits optimal performance.

In addition, the CE module generating the thermal energy through the condensation and evaporation of the refrigerant is packaged, and the high-performance R152-a or R744 refrigerant is used, such that a size and a weight may be reduced, and generation of noise, vibrations, and operation instability may be prevented as compared with an air conditioner device according to the related art.

In addition, the CE module together includes the sub condenser secondarily condensing the refrigerant and the coolant through heat-exchange and the sub heat exchanger condensing the low-temperature refrigerant and the condensed refrigerant so as to increase a condensing amount of the refrigerant, thereby improving the cooling performance and efficiency through increasing the sub-cool of the refrigerant.

Further, the entire heat pump system for a vehicle is simplified, thereby making it possible to reduce a cost required for manufacturing the heat pump system for a vehicle and a weight of the heat pump system for a vehicle and improve space utilization.

DETAILED DESCRIPTION

Figure 1:
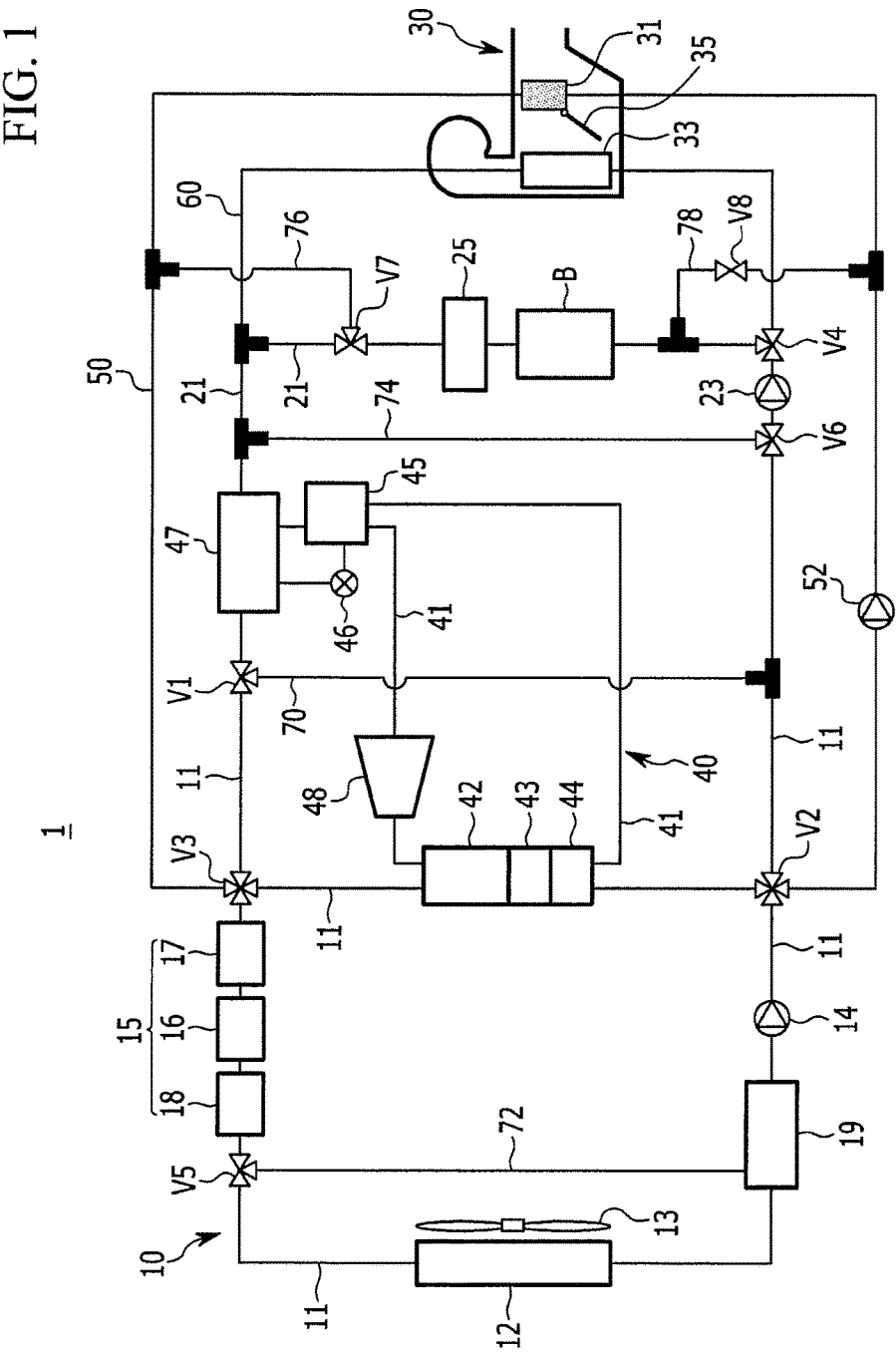
FIG. 1 is a block diagram of a heat pump system for a vehicle according to an exemplary embodiment of the present disclosure.

An exemplary embodiment of the present disclosure will hereinafter be described in detail with reference to the accompanying drawings.

Since exemplary embodiments stated in the present specification and configurations shown in the accompanying drawings are only exemplary embodiments of the present disclosure and do not represent the spirit of the present disclosure. Therefore, it is to be understood that various equivalents and modifications that may replace exemplary embodiments stated in the present specification and configurations shown in the accompanying drawings in a point in time at which the present disclosure is filed.

A description for contents that are not associated with the present disclosure will be omitted in order to clearly describe the present disclosure, and like reference numerals designate like elements throughout the specification.

Since sizes and thicknesses of the respective components were arbitrarily shown in the accompanying drawings for convenience of explanation, the present disclosure is not limited to contents shown in the accompanying drawings. In addition, thicknesses were exaggerated in order to obviously represent several portions and regions.

In addition, throughout the present specification, unless explicitly described to the contrary, the word "comprise" and variations such as "comprises" or "comprising", will be understood to imply the inclusion of stated elements but not the exclusion of any other elements.

In addition, the terms "~unit", "~means", "~part", "member", and the like, described in the specification mean units of a comprehensive configuration for performing at least one function or operation.

FIG. 1 is a block diagram of a heat pump system for a vehicle according to an exemplary embodiment of the present disclosure.

The heat pump system 1 for a vehicle according to an exemplary embodiment of the present disclosure exchanges thermal energy generated in a refrigerant at the time of condensing and evaporating the refrigerant with heat of a coolant to perform a cooling or heating mode of the vehicle only using a low-temperature or high-temperature coolant.

This heat pump system 1 is applied to a hybrid vehicle or electric vehicle. Referring to FIG. 1, the heat pump system 1 includes a cooling device 10, a battery module B, a HVAC module 30, and a centralized energy (CE) module 40.

First, the cooling device 10 includes a radiator 12 connected to a cooling line 11 and a first water pump 14, and circulates a coolant along the cooling lines 11 so as to cool an electric component 15.

Here, the electric component 15 may include a motor 16 and an electric power control unit (EPCU) 17 and an on-board charger (OBC) 18 disposed at both sides of the motor 16.

The motor 16 and the electric power control unit 17 may generate heat while the vehicle is being driven, and the on-board charger 18 may generate heat while the battery module B is being charged.

Therefore, in the case of recovering waste heat from the electric component 15 in the heating mode of the vehicle, the heat generated from the motor 16 and the electric power control unit 17 is recovered, and the heat generated from the on-board charger 18 may be recovered at the time of charging the battery module B.

The radiator 12 is disposed at the front of the vehicle, and has a cooling fan 13 disposed therebehind to cool the coolant through an operation of the cooling fan 13 and exchange heat with an external air.

The cooling device 10 configured as described above circulates the coolant cooled in the radiator 12 along the cooling lines 11 through an operation of the first water pump 14 to cool the electric component 15 so as not to be overheated.

The battery module B is provided on a battery cooling line 21 selectively connected to the cooling line 11 through a first valve V1.

The battery module B supplies a power to the electric component 15, and is a water cooling type that the battery module is cooled by a coolant flowing along the battery cooling line 21. Here, a second water pump 23 is provided on the battery cooling line 21.

The second water pump 23 is provided on the battery cooling line 21 between the radiator 12 and the battery module B. The second water pump 23 is operated to circulate the coolant through the battery cooling lines 21.

That is, the battery module B is connected to the cooling device 10 through the battery cooling line 21 and the coolant may be circulated in the battery module B through an operation of the second water pump 23.

In the present exemplary embodiment, the HVAC module (Heating, Ventilation and Air Conditioning) 30 includes an internal heater 31, a cooler 33, and an opening or closing door 35.

The internal heater 31 is connected to the cooling line 11 through a first connection line 50. The cooler 33 is connected to the battery cooling line 21 through a second connection line 60.

In addition, the opening or closing door 35 is provided between the internal heater 31 and the cooler 33. The opening or closing door 35 controls the external air passing through the cooler 33 to be selectively introduced into the internal heater 31 depending on cooling, heating, and heating and dehumidifying modes of the vehicle.

That is, in the heating mode of the vehicle, the opening or closing door 35 is opened so that the external air passing through the cooler 33 is introduced into the internal heater

31. To the contrary, in the cooling mode of the vehicle, the opening or closing door 35 closes the internal heater 31 so that the external air cooled while passing through the cooler 33 is directly introduced into an interior of the vehicle.

The CE module 40 is connected to each of the cooling line 11 and the battery cooling line 21. The CE module 40 exchanges a thermal energy, generated at the time of condensing and evaporating a refrigerant circulated therein with heat of a coolant, and supplies a low-temperature or high-temperature coolant of which the heat is exchanged to the HVAC module 30.

Here, the refrigerant is a high-performance R152-a or R744 refrigerant.

That is, the high-temperature coolant is supplied to the internal heater 31 through the first connection line 50, and the low-temperature coolant is supplied to the cooler 33 through the second connection line 60.

Here, the CE module 40 includes a condenser 42 connected through a refrigerant line 41, a sub condenser 44, a sub heat exchanger 45, an expansion valve 46, a evaporator 47, and a compressor 48.

First, the condenser 42 and the sub condenser 44 are provided on the cooling lines 11 connected to each other through a second valve V2 provided on the cooling line 11 between the radiator 12 and the battery module B and a third valve V3 provided on the cooling line 11 between the electric component 15 and the first valve V1.

Here, a receiver drier 43 is provided between the condenser 42 and the sub condenser 44.

The receiver drier 43 separates a coolant of a gas state included in the coolant exhausted from the condenser 42 and inflows it to the sub condenser 44.

Accordingly, the condenser 42 exchanges heat between a refrigerant introduced thereinto and a coolant to condense the refrigerant, and supplies thermal energy generated at the time of condensing the refrigerant to the coolant to raise a temperature of the coolant.

The sub condenser 44 further condenses the refrigerant supplied from the receiver drier 43 by being thermally exchanged with the coolant.

The sub heat exchanger 45 is connected with the sub condenser 44 through the refrigerant line 41.

The expansion valve 46 is connected to the sub heat exchanger 45 through the refrigerant line 41. The expansion valve 46 receives and expands the refrigerant passing through the sub heat exchanger 45.

The expansion valve 46 may be a mechanical expansion valve or an electronic expansion valve.

The evaporator 47 is connected with the expansion valve 46 through the refrigerant line 41. The evaporator 47 is provided on the battery cooling line 21 between the battery module B and the first valve V1.

The evaporator 47 exchanges heat between a refrigerant introduced thereinto and a coolant to evaporate the refrigerant, and supplies low-temperature thermal energy generated at the time of evaporating the refrigerant to the coolant to lower a temperature of the coolant.

Here, the refrigerant exhausted from the evaporator 47 exchanges heat with the refrigerant supplied from the sub condenser 44 while being passing through the sub heat exchanger 45, and then may be supplied to the compressor 48.

That is, the condensed refrigerant exhausted from the condenser 44 and a refrigerant of a low temperature and a low pressure exhausted from the evaporator 47 are respectively flowed into the sub heat exchanger 45. Accordingly, the sub heat exchanger 45 may lower a temperature of the refrigerant and increase the condensing amount of the refrigerant through secondarily heat-exchange with a low-temperature refrigerant and a medium-temperature refrigerant.

The sub heat exchanger 45 secondarily further condenses the refrigerant, primarily condensed in the condenser 44, thereby increasing a sub-cool of the refrigerant, accordingly improving a coefficient of performance (COP) that is a coefficient of cooling performance compared to power consumed of the compressor.

In the present exemplary embodiment, the sub heat exchanger 45 heat-exchanges the medium-temperature refrigerant with the low-temperature refrigerant has been described by way of example in the present exemplary embodiment, the present disclosure is not limited thereto. The sub heat exchanger 45 bypasses and cools a part of the refrigerant exhausted from the sub condenser 44, and cools a remaining refrigerant by using the cooled refrigerant and the low-temperature refrigerant exhausted from the evaporator 47 so as to increase a sub-cool.

The condenser 42, the sub condenser 44, and the evaporator 47 are water cooling type heat exchanger in which the coolant introduced inside through the cooling line 11 and the battery cooling line 21.

When the expansion valve 46 is the mechanical type, the refrigerant expands in the expansion valve 46 and inflows to the evaporator 47 after sequentially passing through the condenser 42, the sub condenser 44, and the sub heat exchanger 45. The refrigerant exhausted from the evaporator 47 may be exhausted to the compressor 48 through the expansion valve 46 after passing through the sub heat exchanger 45.

That is, when the refrigerant again passes through the expansion valve 46 after passing through the sub heat exchanger 45 from the evaporator 47, the expansion valve 46 senses the temperature and the pressure of the refrigerant to control an expansion amount of the refrigerant.

On the other hand, when the expansion valve 46 is the electronic type, the refrigerant expands in the expansion valve 46 and inflows to the evaporator 47 after sequentially passing through the condenser 42, the sub condenser 44, and the sub heat exchanger 45. The refrigerant exhausted from the evaporator 47 may be exhausted to the compressor 48 after passing through the sub heat exchanger 45.

In this case, a sensor measuring the temperature and the pressure of the refrigerant is separately provided at the refrigerant line 41 connecting the sub heat exchanger 45 and the compressor 48, and this sensor measures a superheat of the refrigerant to control the expansion amount of the expansion valve 46.

Also, the compressor 48 is provided at the refrigerant line 41 between the evaporator 47 and the condenser 42. The compressor 48 compresses the refrigerant of a gas state that is exhausted from the evaporator 47 and passes through the sub heat exchanger 45.

Here, the first valve V1 connects the cooling line 11 connected to the electric component 15 and the battery cooling line 21 between the radiator 12 and the evaporator 47.

Further, the first connection line 50 selectively connects the cooling line 11 and the internal heater 31 through the second valve V2 and the third valve V3.

Here, a third water pump 52 may be provided at the first connection line 50. The third water pump 52 circulates the coolant to the first connection line 50.

The first, second and third water pumps 14, 23, and 52 may be an electric water pump.

That is, the high-temperature coolant, of which the temperature is raised while passing through the condenser 42 and the sub condenser 44, is flowed into the internal heater 31 through the first connection line 50 opened by the second and third valves V2 and V3.

Meanwhile, in the present exemplary embodiment, a first branch line 70 connecting the evaporator 47 and the battery module B through the first valve V1 is provided on the battery cooling line 21.

The first valve V1 selectively connects the cooling line 11 and the battery cooling line 21 to each other or selectively connects the battery cooling line 21 and the first branch line 70 to each other to control a flow of the coolant.

That is, the first valve V1 may connect the cooling line 11 connected to the radiator 12 and the battery cooling line 21 to each other and close the first branch line 70, in the case of cooling the battery module B using the coolant cooled in the radiator 12.

In addition, the first valve V1 may open the first branch line 70 and close connection between the cooling line 11 and the battery cooling line 21, in the case of raising a temperature of the battery module B or in the case of cooling the battery module B using the coolant exchanging the heat with the refrigerant.

Therefore, the low-temperature coolant of which the heat exchange with the coolant is completed in the evaporator 47 is introduced into the battery module B through the first branch line 70 opened by the first valve V1, thereby making it possible to efficiently cool the battery module B.

In the present exemplary embodiment, the second connection line 60 is connected to the battery cooling line 21 through a fourth valve V4 between the evaporator 47 and the battery module B connected to each other through the first branch line 70.

The fourth valve V4 selectively opens or closes the battery cooling line 21 connected to the battery module B, and selectively connects the second connection line 60 and the battery cooling line 21 to each other to supply the low-temperature coolant to the cooler 33.

A second branch line 72 connected to the cooling line 11 between the radiator 12 and the first water pump 14 through the fifth valve V5 may be provided at the cooling line 11 connecting the electric component 15 and the radiator 12.

The second branch line 72 is selectively opened through an operation of the fifth valve V5 in the case of absorbing the waste heat generated in the electric component 15 and the battery module B to raise a temperature of the coolant. In this case, the cooling line 11 connected to the radiator 12 is closed through the operation of the fifth valve V5.

A third branch line 74 branching the battery cooling line 21 through the sixth valve V6 to control the supply of the coolant to the battery module B is provided at the battery cooling line 21 between the evaporator 47 and the battery module B.

The third branch line 74 is selectively opened through the operation of the sixth valve V6 when raising the temperature of the battery module B in the heating mode of the vehicle. In this case, the battery cooling line 21 passing through the battery module B is closed through the operation of the sixth valve V6.

In the present exemplary embodiment, a first battery heating line 76 connected to the first connection line 50 through a seventh valve V7 provided at a rear of the battery module B based on the flow direction of the coolant is provided at the battery cooling line 21 of the battery module B.

Also, a second battery heating line 78 connected to the first connection line 50 at a front of the battery module B based on the flow direction of the coolant is provided at the battery cooling line 21 passing through the battery module B. An eighth valve V8 may be provided at the second battery heating line 78.

Here, when raising the temperature of the battery module B in the cooling mode, the heating mode, and the heating/dehumidifying mode of the vehicle, the first and second battery heating lines 76 and 78 may connect the battery cooling line 21 passing through the battery module B to the first connection line 50 through the operation of the seventh and eighth valves V7 and V8.

That is, the coolant of the high-temperature supplied to the internal heater 31 through the first connection line 50 inflows to the battery module B through the first and second battery heating lines 76 and 78. Accordingly, the temperature of the battery module B may rise.

Meanwhile, a reservoir tank 19 connected to the second branch line 72 may be provided between the radiator 12 and the first water pump 14. The coolant introduced from the radiator 12 and cooled may be stored in the reservoir tank 19.

Here, the second and third valves V2 and V3 may be a 4-way valve, and the first, fourth, fifth, sixth, and seventh valves V1, V4, V5, V6, and V7 may be a 3-Wwy valve that may distribute a flow rate. Further, the eighth valve V8 may be a 2-way valve.

Hereinafter, operations and actions, in each mode, of the heat pump system for the vehicle according to an exemplary embodiment of the present disclosure configured as described above will be described in detail with reference to FIG. 2 to FIG. 8.

First, an operation in the case of cooling the electric component 15 in the cooling mode of the vehicle will be described with reference to FIG. 2.

Figure 2:
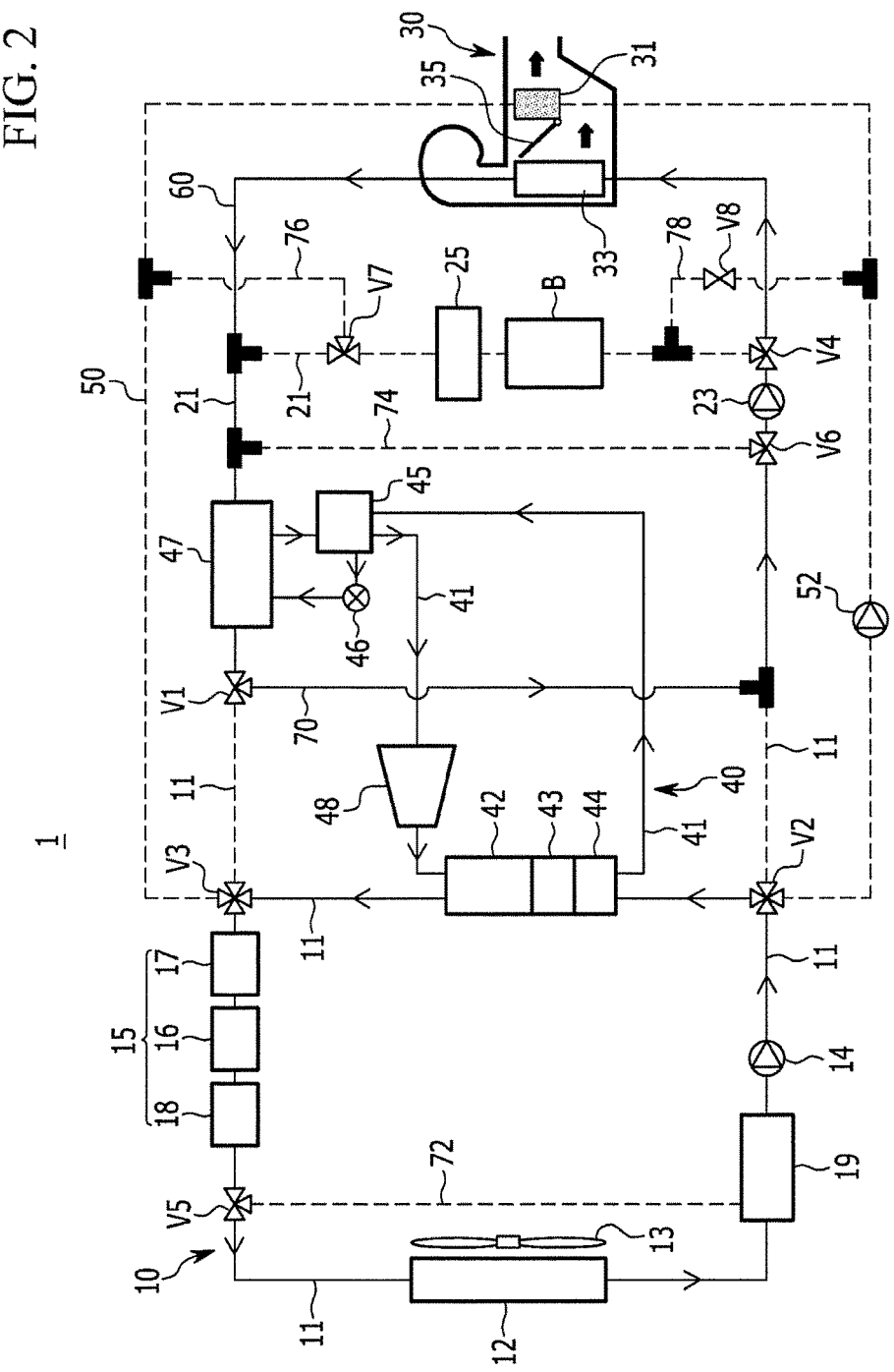
FIG. 2 is a block diagram showing an operation state depending on a cooling mode of a vehicle in the heat pump system for a vehicle according to an exemplary embodiment of the present disclosure.

FIG. 2 is a block diagram showing an operation state depending on a cooling mode of a vehicle in the heat pump system for a vehicle according to an exemplary embodiment of the present disclosure.

Referring to FIG. 2, the cooling device 10 is operated in order to cool the electric component 15. In addition, the respective components of the CE module 40 are operated in order to cool the interior of the vehicle, such that the refrigerant is circulated along the refrigerant line 41.

Here, the first branch line 70 is opened through an operation of the first valve V1.

The second connection line 60 is opened in a state in which the battery cooling line 21 connected to the battery module B is closed through an operation of the fourth valve V4.

In addition, the first connection line 50 is closed, and the cooling line 11 connecting the electric component 15 and the condenser 42 is opened through operations of the second and third valves V2 and V3.

Here, the connection between the cooling line 11 and the battery cooling line 21 is closed through operations of the first, second and third valves V1, V2 and V3.

In addition, the second branch line 72 is closed through an operation of the fifth valve V5. At the same time, the fifth valve V5 opens the cooling line 11 connecting the electric component 15 and the radiator 12 to each other.

The third branch line 74 is closed through the operation of the sixth valve V6.

Therefore, the coolant cooled in the radiator 12 cools the electric component 15 while being circulated along the cooling lines 11 connected to each other by the second, third, and fifth valves V2, V3, and V5 through an operation of the first water pump 14.

In addition, the coolant of the battery cooling line 21 is circulated along the battery cooling line 21, the first branch line 70, and the second connection line 60 by an operation of the second water pump 23.

In this case, the battery cooling line 21 connected to the battery module B is closed through an operation of the fourth valve V4 such that the inflow of the coolant is prevented.

Here, the sub condenser 44 additionally condenses the medium-temperature refrigerant passing through the receiver drier 43 from the condenser 42 with the coolant circulating the cooling line 11 to increase a condensing amount of the refrigerant through the heat-exchange.

The sub heat exchanger 45 additionally condenses the medium-temperature refrigerant exhausted from the sub condenser 44 with the low-temperature refrigerant exhausted from the evaporator 47 through the heat-exchange so as to further increase the condensing amount through the sub-cool increasing of the refrigerant, thereby the condensing amount of the refrigerant increases.

Further, the evaporator 47 exchanges heat between the coolant circulated along the battery cooling line 21 and the low-temperature refrigerant evaporated therein, and supplies the low-temperature coolant to the cooler 33.

That is, the refrigerant circulated along the refrigerant line 41 in the CE module 40 is primarily condensed through heat-exchange with the coolant passing through the condenser 42. Then, the refrigerant is secondarily condensed while again exchanging heat in the sub condenser 44 so that the condensing amount of the refrigerant is increased.

The condensing amount is further increased while the refrigerant exhausted from the sub condenser 44 is additionally heat-exchanged with the low-temperature refrigerant supplied from the evaporator 47 in the sub heat exchanger 45.

Thereafter, the refrigerant, that the condensing amount is increased, is expanded in the expansion valve 46, and is evaporated in the evaporator 47.

In this case, the refrigerant evaporated in the evaporator 47 cools the coolant introduced through the battery cooling line 21. The refrigerant of which the condensing amount is increased while sequentially passing through the condenser 42, the sub condenser 44, and the sub heat exchanger 45 is expanded and supplied to the evaporator 47, thereby evaporating the refrigerant to lower temperature in the evaporator 47.

That is, in the present exemplary embodiment, the sub condenser 44 and the sub heat exchanger 45 secondarily condenses the refrigerant, thereby advantaging sub-cool formation. In addition, the cooling performance and efficiency can be improved in the cooling mode of the vehicle.

On the other hand, the refrigerant evaporated in the evaporator 47 cools the coolant introduced through the battery cooling line 21. The coolant is cooled to a lower temperature while passing through the evaporator 47, and is supplied into the cooler 33 through the second connection line 60.

Thus, the external air introduced into the HVAC module 30 is cooled while exchanging heat with the coolant that is introduced into the cooler 33 and is in a low-temperature state.

The opening or closing door 35 closes a portion through which the cooled external air passes into the internal heater 31 so that the cooled external air does not pass through the internal heater 31. Therefore, the cooled external air is directly introduced into the interior of the vehicle, thereby making it possible to efficiently cool the interior of the vehicle.

Meanwhile, in the case of cooing the battery module B together with the electric component 15 in the cooling mode of the vehicle, the battery cooling line 21 connected to the battery module B may be opened through the operation of the fourth valve V4.

The first and second battery heating lines 76 and 78 are closed through the operation of the seventh and eighth valves V7 and V8.

In this case, the coolant cooled while passing through the evaporator 47 is circulated along the battery cooling line 21 connected to the battery module B and the second connection line 60. Therefore, the battery module B may be efficiently cooled by the low-temperature coolant supplied to the battery cooling line 21.

The operation for the case increasing the temperature of the battery module B in the cooling mode of the vehicle will be described with reference to FIG. 3.

Figure 3:
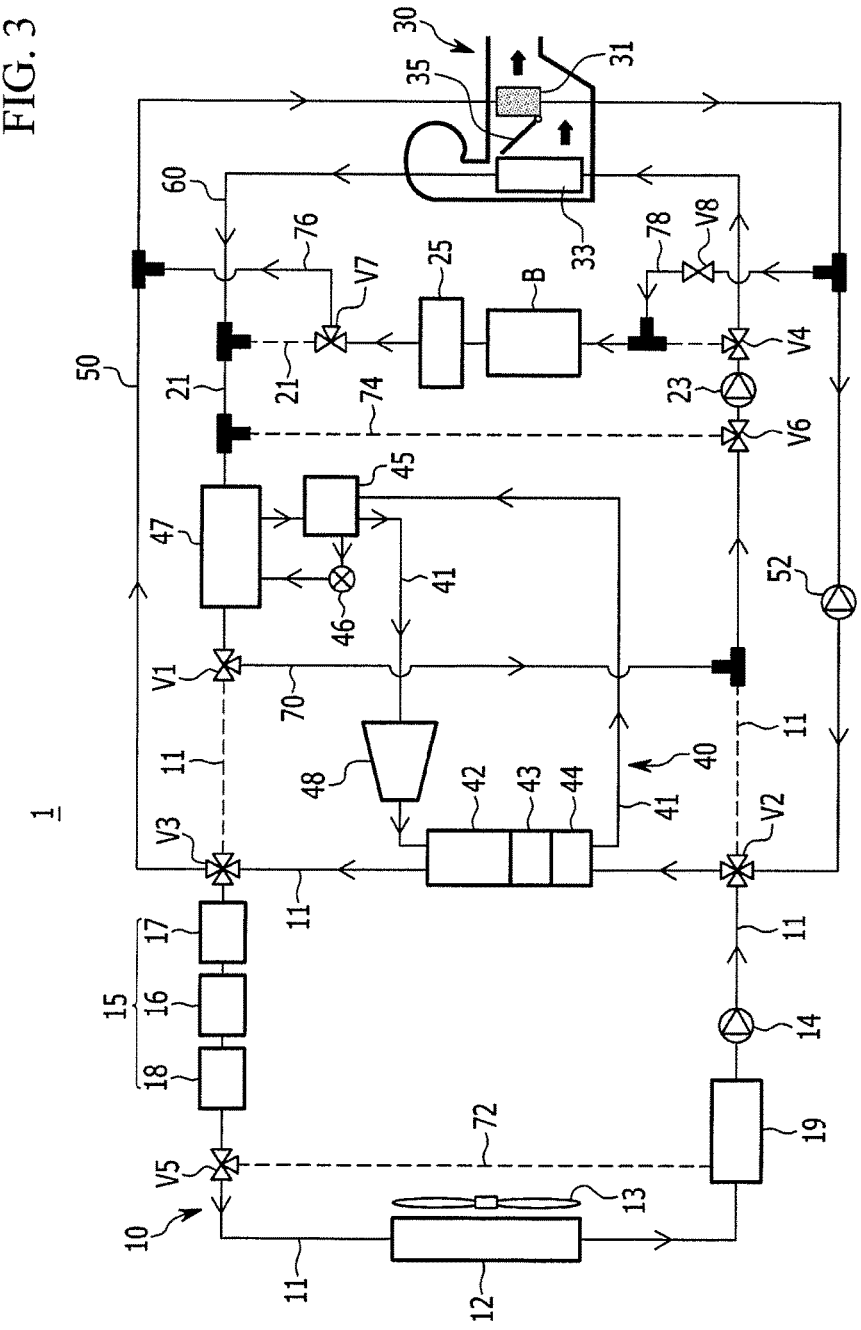
FIG. 3 is a block diagram showing an operation state for increasing a temperature of a battery module on a cooling mode of a vehicle in a heat pump system for a vehicle according to an exemplary embodiment of the present disclosure.

FIG. 3 is a block diagram showing an operation state for increasing a temperature of a battery module on a cooling mode of a vehicle in a heat pump system for a vehicle according to an exemplary embodiment of the present disclosure.

Referring to FIG. 3, the cooling device 10 is operation to cool the electric component 15. The respective components of the CE module 40 are operated in order to cool the interior of the vehicle, such that the refrigerant is circulated along the refrigerant line 41.

Here, the first branch line 70 is opened through an operation of the first valve V1.

The second connection line 60 is opened in a state in which the battery cooling line 21 connected to the battery module B is closed through an operation of the fourth valve V4.

In addition, the first connection line 50 is closed and the cooling line 11 connecting the electric component 15 and the condenser 42 is opened, through operations of the second and third valves V2 and V3.

Here, the connection between the cooling line 11 and the battery cooling line 21 is closed through operations of the first, second and third valves V1, V2 and V3.

In addition, the second branch line 72 is closed through an operation of the fifth valve V5. At the same time, the fifth valve V5 opens the cooling line 11 connecting the electric component 15 and the radiator 12 to each other.

The third branch line 74 is closed through the operation of the sixth valve V6.

Therefore, the coolant cooled in the radiator 12 cools the electric component 15 while being circulated along the cooling lines 11 connected to each other by the second, third, and fifth valves V2, V3, and V5 through an operation of the first water pump 14.

In addition, the coolant of the battery cooling line 21 is circulated along the battery cooling line 21, the first branch line 70, and the second connection line 60 by an operation of the second water pump 23.

In this case, the battery cooling line 21 connected to the battery module B is closed by the fourth valve V4 such that the inflow of the coolant is prevented.

Here, the sub condenser 44 may secondarily condenses the medium-temperature refrigerant passing through the receiver drier 43 from the condenser 42 through heat-exchange with the coolant circulated along the cooling line 11 so as to increase a condensing amount of the refrigerant.

The sub heat exchanger 45 may secondarily condenses the medium-temperature refrigerant exhausted from the sub condenser 44 with the low-temperature refrigerant exhausted from the evaporator 47 through the heat exchange so as to increase the condensing amount of the refrigerant through the increasing of the sub-cool, thereby increasing the condensing amount of the refrigerant.

Here, the evaporator 47 exchanges heat between the coolant circulated along the battery cooling line 21 and the low-temperature refrigerant evaporated therein, and supplies the low-temperature coolant to the cooler 33.

That is, the refrigerant circulated along the refrigerant line 41 in the CE module 40 is primarily condensed through heat-exchange with the coolant passing through the condenser 42. Then, the refrigerant is secondarily condensed in the sub condenser 44 through the heat exchange with the coolant so that the condensing amount is increased.

The refrigerant exhausted from the sub condenser 44 secondarily exchanges heat with the low-temperature refrigerant supplied from the evaporator 47 in the sub heat exchanger 45 such that the condensing amount is further increased.

Next, the refrigerant of which the condensing amount is increased is expanded in the expansion valve 46 and is evaporated in the evaporator 47.

In this case, the refrigerant evaporated in the evaporator 47 cools the coolant introduced through the battery cooling line 21. Here, the refrigerant of which the condensing amount is increased while sequentially passing through the condenser 42, the sub condenser 44, and the sub heat exchanger 45 is expanded and supplied to the evaporator 47, thereby evaporating the refrigerant with the further lower temperature.

That is, in the present exemplary embodiment, as the sub condenser 44 and the sub heat exchanger 45 secondarily condenses the refrigerant, thereby advantaging sub-cool formation. In addition, the cooling performance and efficiency can be improved in the cooling mode of the vehicle.

On the other hand, the refrigerant evaporated in the evaporator 47 cools the coolant introduced through the battery cooling line 21. Accordingly, the coolant is cooled into the low temperature while passing through the evaporator 47 and is supplied to the cooler 33 through the second connection line 60.

This, the external air introduced to the HVAC module 30 is cooled while exchanging heat with the coolant of the low temperature state introduced to the cooler 33.

The opening or closing door 35 closes a portion passing through the internal heater 31 so that the cooled external air does not pass the internal heater 31. Therefore, the cooled external air is directly introduced into the interior of the vehicle, thereby cooling the interior of the vehicle.

In order to increase the temperature of the battery module B, the first and second battery heating lines 76 and 78 are opened through the operation of the seventh and eighth valves V7 and V8.

The first and second battery heating lines 76 and 78 may connect the opened first connection line 50 and the battery cooling line 21 passing through the battery module B.

Accordingly, the coolant is circulated through the operation of the third water pump 52 in the cooling line 11 passing through the condenser 42 and the sub condenser 44, and the first connection line 50 connected to the cooling line 11 by the second and third valves V2 and V3.

That is, the coolant passing through the condenser 42 and the sub condenser 44 is compressed into the high temperature and pressure in the compressor 48 and exchanges heat with the supplied refrigerant such that the temperature thereof may be further increased.

Therefore, the coolant, of which the temperature is raised while passing through the condenser 42 and the sub condenser 44, is supplied to the internal heater 31.

In this case, the opening or closing door 35 is closed so that the external air introduced into the HVAC module 30 and passing through the cooler 33 does not pass through the internal heater 31.

In this state, the high-temperature coolant circulated along the first connection line 50 may increase the temperature of the battery module B while being circulated into the battery cooling line 21 connected to the battery module B through the first and second battery heating lines 76 and 78.

An operation of recovering the waste heat from the electric component and the battery module in the heating mode of the vehicle will be described with reference to FIG. 4.

Figure 4:
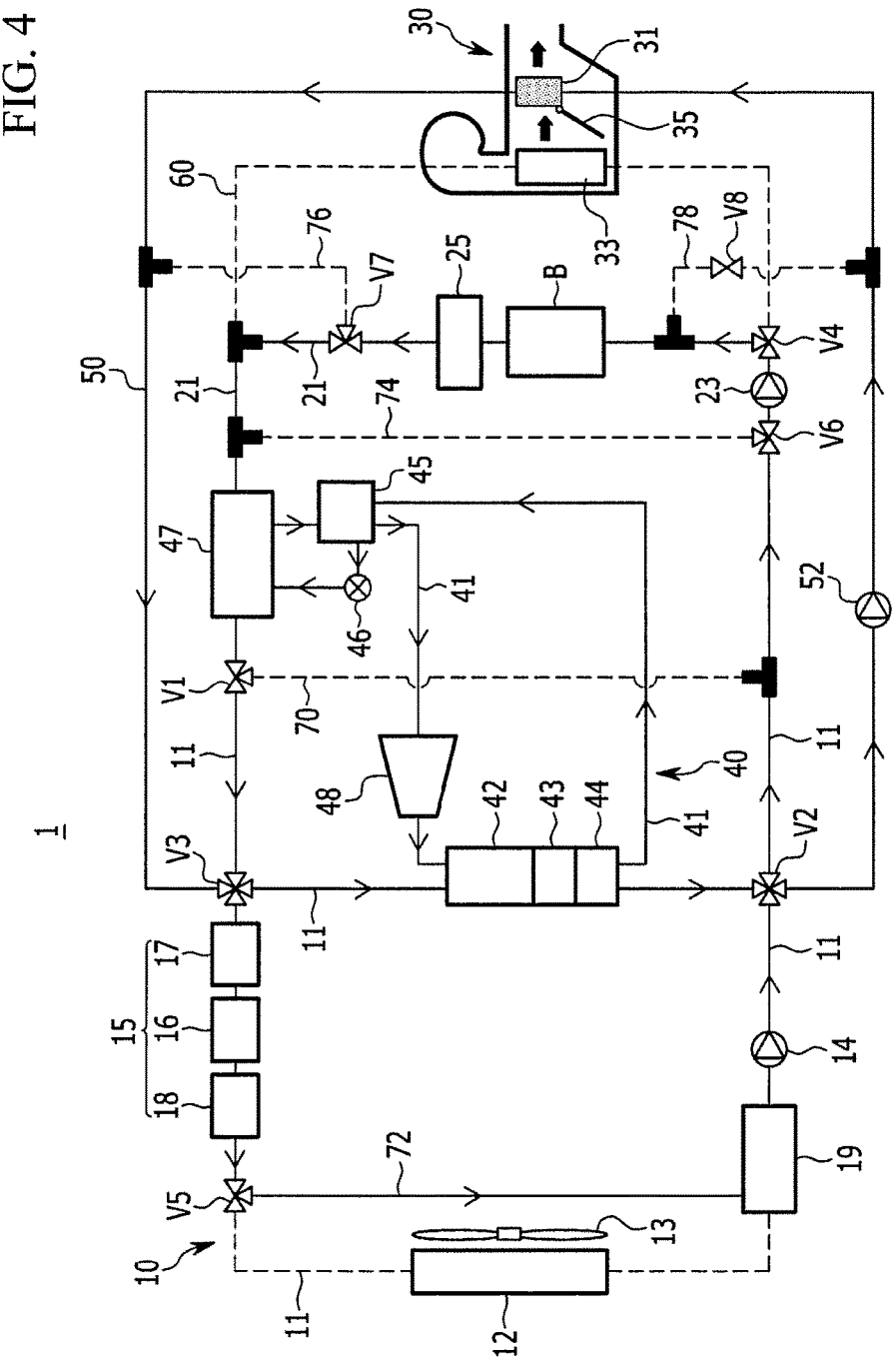
FIG. 4 is a block diagram showing an operation state for recovering a waste heat from an electric component and a battery module in a heating mode of a vehicle in a heat pump system for a vehicle according to an exemplary embodiment of the present disclosure.

FIG. 4 is a block diagram showing an operation state for recovering a waste heat from an electric component and a battery module in a heating mode of a vehicle in a heat pump system for a vehicle according to an exemplary embodiment of the present disclosure.

Referring to FIG. 4, in the case of recovering the waste heat of the electric component 15 and the battery module B in the heating mode of the vehicle, the respective components of the CE module 40 are operated in order to heat the interior of the vehicle, such that the refrigerant is circulated through the refrigerant line 41.

In this case, the first branch line 70 is closed through the operation of the first valve V1.

The battery cooling line 21 connected to the battery module B is opened through the operation of the fourth valve V4. The second connection line 60 is closed through the operation of the fourth valve V4.

The cooling line 11 and the first connection line 50 connecting the electric component 15, and the condenser 42 and the sub condenser 44 are opened through the operation of the second and third valves V2 and V3.

Further, the cooling line 11 is connected to the battery cooling line 21 through the operation of the first, second and third valves V1, V2, and V3. In the state that the fifth valve V5 opens the second branch line 72, the fifth valve V5 closes the cooling line 12 connecting the electric component 15 and the radiator 12.

In addition, the third branch line 74 is closed through the operation of the sixth valve V6.

The first and second battery heating lines 76 and 78 are closed through the operation of the seventh and eighth valves V7 and V8.

Therefore, the cooling line 11 and the battery cooling line 21 are connected to each other through selective operations of the first to fifth valves V1 to V5, and may form one closed circuit along which the coolant is circulated.

Here, the waste heat generated in the electric component 15 and the waste heat generated in the battery module B raise the temperature of the coolant circulated along the cooling line 11 and the battery cooling line 21.

The coolant of which the temperature is raised further raises a temperature of the refrigerant exhausted from the evaporator 47 while passing through the evaporator 47 through operations of the first and second water pumps 14 and 23.

The refrigerant of which the temperature is raised is introduced into the compressor 48, is compressed at a higher temperature and pressure in the compressor 48, and is then introduced into the condenser 42. The refrigerant introduced to the condenser 42 is introduced to the sub condenser 44 through the receiver drier 43.

Here, the coolant is circulated along the cooling line 11 passing through the condenser 42 and the sub condenser 44 and the first connection line 50 connected to the cooling line 11 by the second and third valves V2 and V3 through the operation of the third water pump 52.

The temperature of the coolant sequentially passing through the condenser 42 and the sub condenser 44 may be further raised while the refrigerant exchanges heat with the refrigerant compressed with the higher temperature and pressure in the compressor 48.

Therefore, the coolant, of which the temperature is raised while passing through the condenser 42 and the sub condenser 44, is supplied to the internal heater 31.

The opening or closing door 35 is opened so that the external air introduced into the HVAC module 30 and passing through the cooler 33 to which the supply of the coolant is stopped passes through the internal heater 31.

In this case, as the second connection line 60 is closed, the supply of the coolant is stopped to the cooler 33.

Accordingly, the external air introduced from the outside is introduced in a room temperature state that is not cooled when passing through the cooler 33. The introduced external air is converted in the high-temperature state while passing through the internal heater 31 and is introduced in the vehicle interior, such that heating of the interior of the vehicle may be implemented.

Meanwhile, the heater 25 may be selectively turned on, if necessary, to heat the coolant circulated along the battery cooling line 21. Therefore, the temperature of the refrigerant passing through the evaporator 47 may be rapidly raised.

That is, the heat pump system 1 for a vehicle according to the present exemplary embodiment uses waste heat sources generated in the electric component 15 and the battery module B to raise the temperature of the refrigerant in the heating mode of the vehicle, thereby making it possible to reduce power consumption of the compressor 48 and improve heating efficiency.

Figure 5:
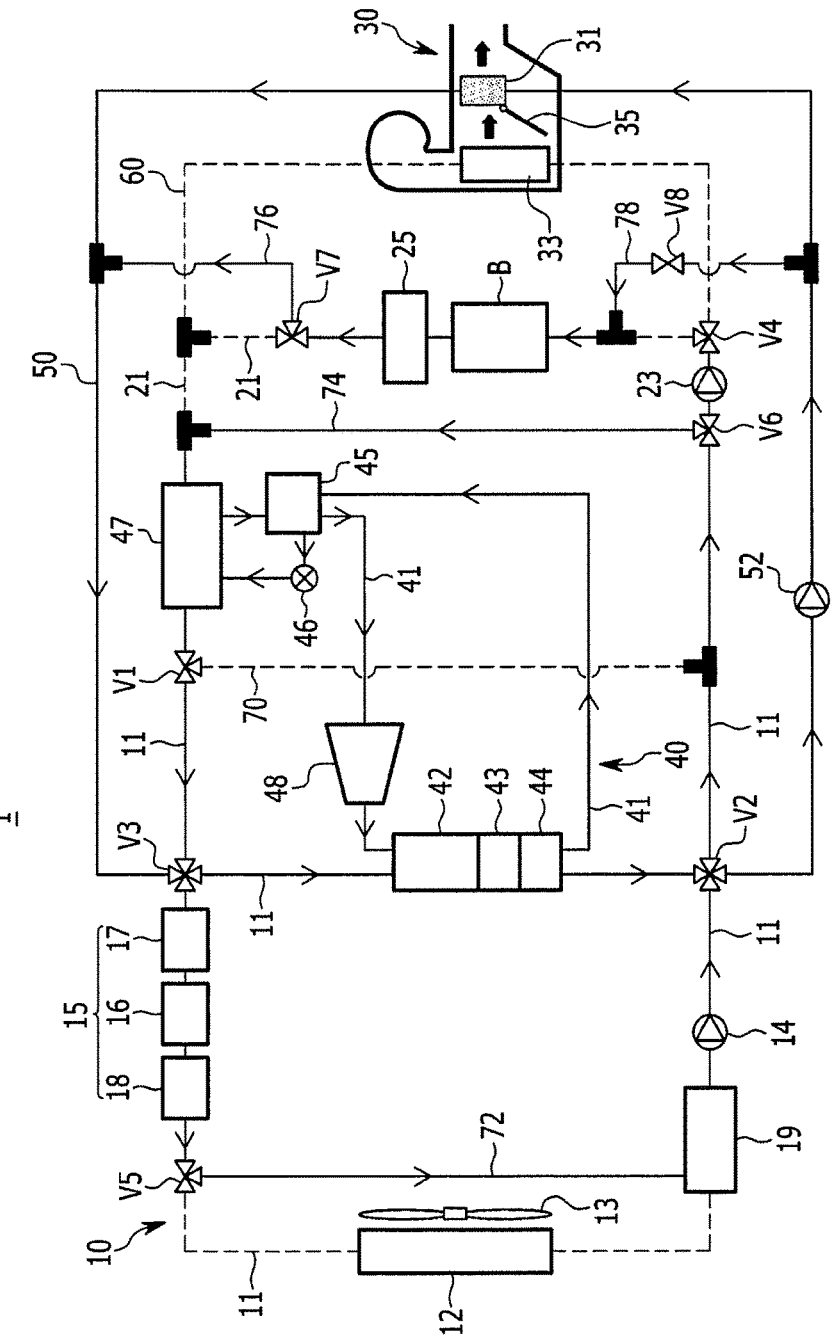
FIG. 5 is a block diagram showing an operation state for increasing a temperature of a battery module on a heating mode of a vehicle in a heat pump system for a vehicle according to an exemplary embodiment of the present disclosure.

Although not shown in FIG. 5, in the case of recovering the waste heat from only the battery module B in the heating mode of the vehicle, the first branch line 70 is opened through the operation of the first valve V1. At the same time, the connection between the cooling line 11 and the battery cooling line 21 is closed through the operations of the first, second and third valves V1, V2, and V3.

Thus, the coolant recovers the waste heat generated in the battery module B while being circulated along the battery cooling line 21 and the first branch line 70 through an operation of the second water pump 23, such that a temperature of the coolant is raised. The coolant of which the temperature is raised may raise a temperature of the refrigerant through heat-exchange with the refrigerant while passing through the evaporator 47.

That is, although a case in which both of the waste heat of the electric component 15 and the waste heat of the battery module B are recovered or the waste heat of the battery module B is recovered in the heating mode of the vehicle has been described by way of example in the present exemplary embodiment, the present disclosure is not limited thereto. That is, the waste heat generated in the electric component 15 except for the waste heat of the battery module B may also be recovered.

In the present exemplary embodiment, an operation for a case increasing the temperature of the battery module B in the heating mode of the vehicle will be described with reference to FIG. 5.

FIG. 5 is a block diagram showing an operation state for increasing a temperature of a battery module on a heating mode of a vehicle in a heat pump system for a vehicle according to an exemplary embodiment of the present disclosure.

Referring to FIG. 5, in the heating mode of the vehicle, in the case increasing the temperature of the battery module B, the respective components of the CE module 40 are operated in order to heat the interior of the vehicle, such that the refrigerant is circulated through the refrigerant line 41.

In this state, the first branch line 70 is closed through an operation of the first valve V1.

The battery cooling line 21 connected to the battery module B and the second connection line 60 are closed through the operation of the fourth valve V4.

The cooling line 11 and the first connection line 50 connecting the electric component 15, and the condenser 42 and the sub condenser 44 are opened through the operation of the second and third valves V2 and V3.

Further, the cooling line 11 is connected to the battery cooling line 21 through the operation of the first, second, and third valves V1, V2, and V3. In the state that the fifth valve V5 opens the second branch line 72, the fifth valve V5 closes the cooling line 12 connecting the electric component 15 and the radiator 12.

The third branch line 74 is opened through the operation of the sixth valve V6 such that it is connected to the cooling line 11 and the battery cooling line 21.

The first and second battery heating lines 76 and 78 are opened through the operation of the seventh and eighth valves V7 and V8.

Accordingly, the cooling line 11 and the battery cooling line 21 are connected to each other through the selective operation of the first, second, third, fourth, and fifth valves V1, V2, V3, V4, and V5, and one closed circuit that the coolant is circulated may be formed.

Here, the waste heat generated from the electric component 15 increases the temperature of the coolant circulated along the cooling line 11 and the third branch line 74.

While the coolant of which the temperature is raised passes through the evaporator 47 by the operation of the first water pump 14, the refrigerant further increases the temperature of the refrigerant exhausted from the evaporator 47.

The refrigerant of which the temperature is raised is introduced into the compressor 48 and is compressed with the higher temperature and pressure in the compressor 48, and then is introduced to the condenser 42. The refrigerant introduced to condenser 42 is introduced to the sub condenser 44 through the receiver drier 43.

Here, the coolant is circulated through the operation of the third water pump 52 along the cooling line 11 passing through the condenser 42 and the sub condenser 44, and the first connection line 50 connected to the cooling line 11 by the second and third valves V2 and V3.

The coolant sequentially passing through the condenser 42 and the sub condenser 44 exchanges heat with the refrigerant that is compressed and supplied with the high temperature and pressure in the compressor 48, thereby the temperature is further raised.

Accordingly, the coolant of which the temperature is raised which passing through the condenser 42 and the sub condenser 44 is supplied to the internal heater 31.

Here, the opening or closing door 35 is opened so that the external air introduced into the HVAC module 30 and passing through the cooler 33 to which the supply of the coolant is stopped passes through the internal heater 31.

In this case, as the second connection line 60 is closed, the supply of the coolant is stopped to the cooler 33.

Therefore, the external air introduced from the outside is introduced in a room temperature state in which it is not cooled into the cooler 33 at the time of passing through the cooler 33. The introduced external air is changed in a high temperature state while passing through the internal heater 31 and is then introduced into the interior of the vehicle, such that heating of the interior of the vehicle may be implemented.

That is, the heat pump system 1 according to the present exemplary embodiment increases the temperature of the battery module B in the heating mode of the vehicle, as the waste heat source generated from the electric component 15 is used to increase the temperature of the refrigerant, the power consumption of the compressor 48 may be reduced and the heating efficiency may be improved.

Here, the first and second heating lines 76 and 78 that are opened to increase the temperature of the battery module B may connect the opened first connection line 50 and the battery cooling line 21 passing through the battery module B.

Accordingly, while the high-temperature coolant circulated along the first connection line 50 is circulated to the battery cooling line 21 connected to the battery module B through the first and second battery heating lines 76 and 78, the temperature of the battery module B is increased.

The operation in the heating and dehumidifying mode of the vehicle in the present exemplary embodiment will be described with reference to FIG. 6.

Figure 6:
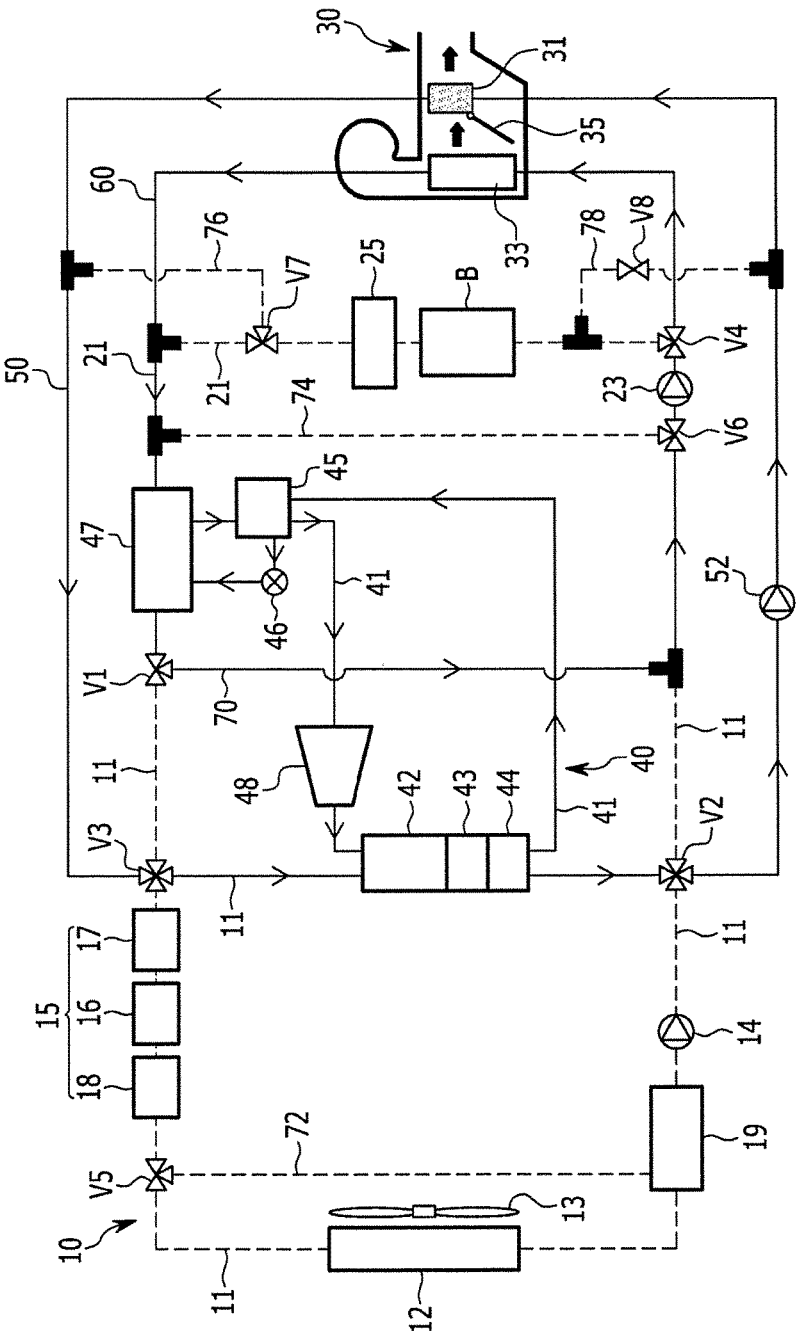
FIG. 6 is a block diagram showing an operation state depending on a heating and dehumidifying mode of the vehicle in the heat pump system for a vehicle according to an exemplary embodiment of the present disclosure.

FIG. 6 is a block diagram showing an operation state depending on a heating and dehumidifying mode of the vehicle in the heat pump system for a vehicle according to an exemplary embodiment of the present disclosure.

Referring to FIG. 6, in the heating and dehumidifying mode of the vehicle, the respective components of the CE module 40 are operated in order to heat the interior of the vehicle, such that the refrigerant is circulated along the refrigerant line 41.

The first branch line 70 is opened through the operation of the first valve V1. The battery cooling line 21 connected to the battery module B is closed through an operation of the fourth valve V4. At the same time, the second connection line 60 is opened by the fourth valve V4, such that the first branch line 70 and the second connection line 60 are connected to each other.

The cooling line 11 connecting the electric component 15, and the condenser 42 and the sub condenser 44, and the first connection line 50 are opened through the operation of the second and third valves V2 and V3 to be connected to each other.

The connection between the cooling line 11 and the battery cooling line 21 is closed through the operations of the first, second, and third valves V1, V2 and V3 in a state in which an operation of the first water pump 14 is stopped.

The second and third branch lines 72 and 74 are closed through the operation of the fifth and sixth valves V5 and V6.

Also, the first and second battery heating lines 76 and 78 are closed through the operation of the seventh and eighth valves V7 and V8.

Accordingly, the coolant is circulated through the operation of the third water pump 52 along the cooling line 11 passing through the condenser 42 and the sub condenser 44 and the first connection line 50 connected to the cooling line 11 by the second and third valves V2 and V3.

Here, the temperature of the coolant passing though the condenser 42 and the sub condenser 44 increases while the refrigerant exchanges heat with the refrigerant exhausted from the compressor 48, compressed in a high-temperature and high-pressure state in the compressor 48, and supplied to the condenser 42. Then, the coolant of which the temperature is raised is supplied to the internal heater 31.

Meanwhile, the coolant of the battery cooling line 21 is circulated along the battery cooling line 21, the first branch line 70, and the second connection line 60 by an operation of the second water pump 23.

Here, the evaporator 47 exchanges heat between the coolant circulated along the battery cooling line 21 and the low-temperature refrigerant evaporated therein, and supplies the low-temperature coolant to the cooler 33.

In this case, the refrigerant evaporated in the evaporator 47 cools the coolant introduced through the battery cooling line 21. In addition, the coolant cooled while passing through the evaporator 47 is supplied to the cooler 33 through the second connection line 60.

Therefore, the external air introduced into the HVAC module 30 is dehumidified while passing through the cooler 33 into which the low-temperature coolant is introduced. Then, the external air is changed into a high-temperature state while passing through the internal heater 31 to which the high-temperature coolant is supplied and is then introduced into the interior of the vehicle, thereby heating and dehumidifying the interior of the vehicle.

In the present exemplary embodiment, the operation for the case increasing the temperature of the battery module B in the heating and dehumidifying mode of the vehicle will be described with reference to FIG. 7.

Figure 7:
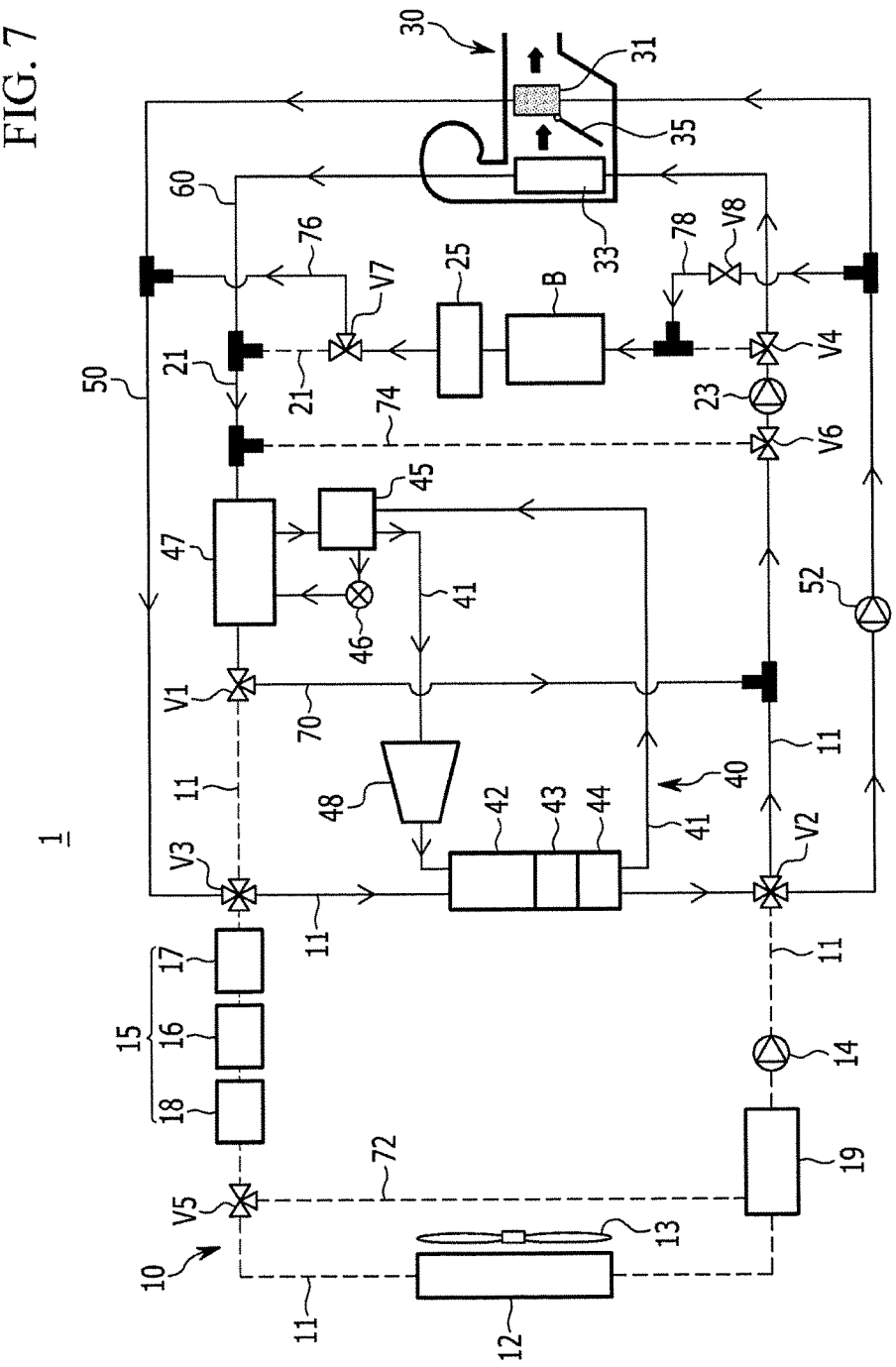
FIG. 7 is a block diagram showing an operation state for increasing a temperature of a battery module on a heating and dehumidifying mode of a vehicle in a heat pump system for a vehicle according to an exemplary embodiment of the present disclosure.

FIG. 7 is a block diagram showing an operation state for increasing a temperature of a battery module on a heating and dehumidifying mode of a vehicle in a heat pump system for a vehicle according to an exemplary embodiment of the present disclosure.

Referring to FIG. 7, when increasing the temperature of the battery module B in the heating and dehumidifying mode of the vehicle, the respective components of the CE module 40 are operated in order to heat the interior of the vehicle, such that the refrigerant is circulated through the refrigerant line 41.

In this state, the first branch line 70 is closed through an operation of the first valve V1. The battery cooling line 21 connected to the battery module B is closed through the operation of the fourth valve V4, and simultaneously, the second connection line 60 is opened by the fourth valve V4 such that the first branch line 70 and the second connection line 60 are connected.

The cooling line 11 and the first connection line 50 connecting the electric component 15, and the condenser 42 and the sub condenser 44 are opened through the operation of the second and third valves V2 and V3 to be connected to each other.

In the state that the operation of the first water pump 14 is stopped, the connection of the cooling line 11 and the battery cooling line 21 are closed through the operation of the first, second and third valves V1, V2, and V3.

The second and third branch lines 72 and 74 are closed through the operation of the fifth and sixth valves V5 and V6.

The first and second battery heating lines 76 and 78 are opened through the operation of the seventh and eighth valves V7 and V8.

Therefore, the coolant is circulated along the cooling line 11 passing through the condenser 42 and the sub condenser 44 and the first connection line 50 connected to the cooling line 11 by the second and third valves V2 and V3 through an operation of the third water pump 52.

Here, the temperature of the coolant passing through the condenser 42 and the sub condenser 44 is raised while the coolant exchanges heat with the refrigerant exhausted from the compressor 48, compressed in a high-temperature and high-pressure state in the compressor 48, and supplied to the condenser. Then, the coolant of which the temperature is raised is supplied to the internal heater 31.

On the other hand, the coolant of the battery cooling line 21 is circulated along the battery cooling line 21, the first branch line 70, and the second connection line 60 through the operation of the second water pump 23.

Here, the evaporator 47 exchanges heat between the coolant circulated along the battery cooling line 21 and a low-temperature refrigerant evaporated therein, and supplies a low-temperature coolant to the cooler 33.

In this case, the refrigerant evaporated in the evaporator 47 cools the coolant introduced through the battery cooling line 21. In addition, the coolant cooled while passing through the evaporator 47 is supplied to the cooler 33 through the second connection line 60.

Therefore, the external air introduced into the HVAC module 30 is dehumidified while passing through the cooler 33 into which the low-temperature coolant is introduced. Then, the external air is changed into a high-temperature state while passing through the internal heater 31 to which the high-temperature coolant is supplied and is then introduced into the interior of the vehicle, thereby heating and dehumidifying the interior of the vehicle.

Here, the first and second heating lines 76 and 78 opened to increase the temperature of the battery module B may connect the opened first connection line 50 and the battery cooling line 21 passing through the battery module B.

Accordingly, while the high-temperature coolant circulated along the first connection line 50 is circulated into the battery cooling line 21 connected to the battery module B through the first and second battery heating line 76 and 78, the high-temperature refrigerant may increase the temperature of the battery module B.

Next, the operation when increasing the temperature of the battery module B in the state that the cooling or heating mode of vehicle is stopped will be described with reference to FIG. 8.

Figure 8:
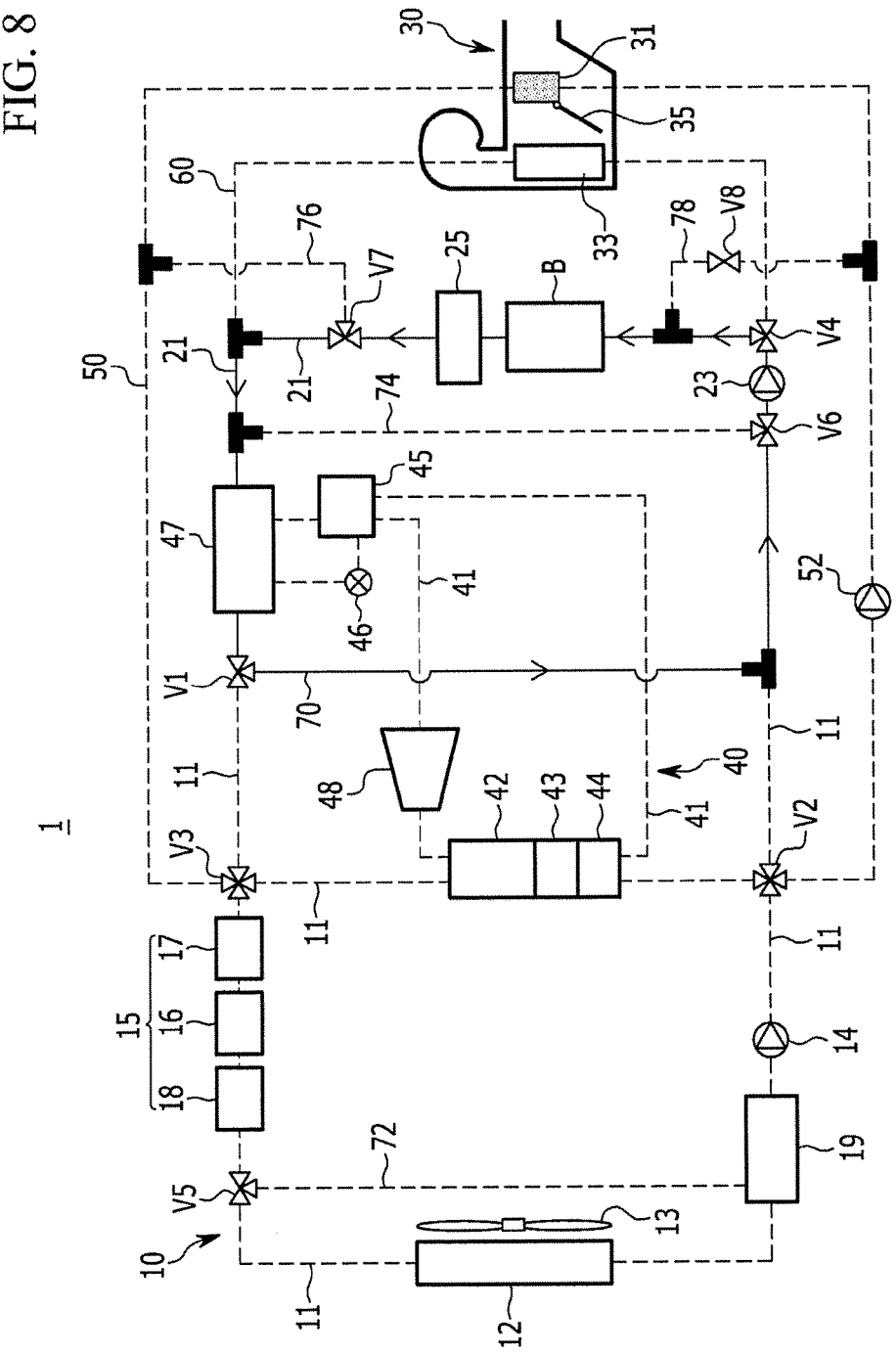
FIG. 8 is a block diagram showing an operation state for increasing a temperature of a battery module when a cooling or heating mode for a vehicle is not operated in a heat pump system for a vehicle according to an exemplary embodiment of the present disclosure.

FIG. 8 is a block diagram showing an operation state for increasing a temperature of a battery module when a cooling or heating mode for a vehicle is not operated in a heat pump system for a vehicle according to an exemplary embodiment of the present disclosure.

Referring to FIG. 8, in the state that the cooling or heating mode of the vehicle is not operated, when raising the temperature of the battery module B, the operation of the CE module 40 is stopped such that the circulation of the refrigerant is stopped.

Further, the first branch line 70 is connected to the battery cooling line 21 through the operation of the first valve V1. Also, the connection of the battery cooling line 21 and the cooling line 11 is closed through the operation of the first valve V1.

Accordingly, the battery cooling line 21 and the first branch line 70 form one closed circuit. Thus, the coolant passes through the battery module B while being circulated along the battery cooling line 21 and the first branch line 70 by the operation of the second water pump 23.

In this case, the heater 25 is operated to be turned on such that the heater 25 heats the coolant circulated along the battery cooling line 21 to be introduced to the battery module B, thereby rapidly increasing the temperature of the battery module B.

Therefore, when the heat pump system 1 for the vehicle according to the exemplary embodiment of the present disclosure as described above is applied, the thermal energy generated from the refrigerant at the time of condensing or evaporating the refrigerant is heat-exchanged with the coolant, and an interior temperature of the vehicle is controlled using the low-temperature or high-temperature coolant of which heat exchanged, thereby making it possible to simplify the heat pump system for a vehicle and simplify a layout of connection pipes through which the refrigerant is circulated.

Moreover, the heat pump system 1 for a vehicle may improve heating efficiency of the vehicle using the waste heat of the electric component 15 and the battery module B, and may increase an entire travel distance of the vehicle by efficiently controlling the temperature of the battery module B so that the battery module B exhibits optimal performance.

Further, the CE module 40 generating the thermal energy through the condensation and evaporation of the refrigerant is packaged, and the high-performance R152-a or R744 refrigerant is used, such that a size and a weight may be reduced, and generation of noise, vibrations, and operation instability may be prevented as compared with an air conditioner device according to the related art.

In addition, the CE module 40 together includes the sub condenser 44 secondarily condensing the refrigerant and the coolant through heat-exchange and the sub heat exchanger 45 condensing the low-temperature refrigerant and the condensed refrigerant so as to increase a condensing amount of the refrigerant, thereby improving the cooling performance and efficiency through increasing the sub-cool of the refrigerant.

Further, the entire heat pump system for a vehicle is simplified, thereby making it possible to reduce a cost required for manufacturing the heat pump system for a vehicle and a weight of the heat pump system for a vehicle and improve space utilization.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A heat pump system for a vehicle, comprising:
   a cooling device including a radiator and a first water pump by a cooling line and circulating a coolant along the cooling line to cool an electric component;
   a battery module provided on a battery cooling line selectively connected to the cooling line through a first valve;
   a heating, ventilation, and air conditioning (HVAC) module including an internal heater connected to the cooling line through a first connection line, a cooler connected to the battery cooling line through a second connection line, and an opening or closing door provided between the internal heater and the cooler and controlling external air passing through the cooler to be selectively introduced into the internal heater depending on cooling, heating, and heating and dehumidifying modes of the vehicle; and a centralized energy (CE) module connected to each of the battery cooling line and the cooling line, exchanging thermal energy generated at the time of condensing and evaporating a refrigerant circulated therein with heat of a coolant, and supplying a low-temperature or high-temperature coolant of which the heat is exchanged to the HVAC module, wherein the CE module is further provided with a sub condenser in which the coolant and the refrigerant secondarily exchange heat to increase a condensing amount through a sub-cooling of the refrigerant and a sub heat exchanger in which the low-temperature refrigerant and the condensed refrigerant exchange heat to secondarily condense refrigerant, the CE module includes:
  a condenser provided on the cooling line connected to each other through a second valve provided on the cooling line between the radiator and the battery module and a third valve provided on the cooling line between the electric component and the first valve;
  a receiver drier provided between the condenser and the sub condenser;
  an expansion valve connected to the sub heat exchanger, connected to the sub condenser through a refrigerant line;
  an evaporator connected to the expansion valve through the refrigerant line and provided on the battery cooling line between the battery module and the first valve; and
  a compressor provided on the refrigerant line between the evaporator and the condenser, the sub condenser connected to the receiver drier through the refrigerant line is provided on the cooling line connected to the condenser, the refrigerant exhausted from the evaporator exchanges heat with the refrigerant supplied from the sub condenser while passing through the sub heat exchanger, and then is supplied to the compressor, the battery cooling line is provided with a first branch line connecting the evaporator and the battery module through the first valve, the second connection line is connected to the battery cooling line through a fourth valve between the evaporator and the battery module connected through the first branch line, the cooling line connecting between the electric component and the radiator is provided with a second branch line connected to the cooling line between the radiator and the first water pump through a fifth valve, a third branch line branching the battery cooling line through a sixth valve is provided to control a supply of the refrigerant to the battery module between the evaporator and the battery module, the battery cooling line passing through the battery module is provided with a first battery heating line connected to the first connection line through a seventh valve provided at a rear of the battery module with respect to a flow direction of the coolant, and the battery cooling line passing through the battery module is provided with a second battery heating line connected to the first connection line at a front of the battery module with respect to the flow direction of the coolant and having an eighth valve.

2. The heat pump system for the vehicle of claim 1, wherein:

the first valve connects the cooling line connected to the electric component between the radiator and the evaporator, and the battery cooling line, and the first connection line selectively connects the cooling line and the internal heater through the second valve and the third valve.

3. The heat pump system for the vehicle of claim 1, wherein:

in a case of cooling the electric component in a cooling mode of the vehicle, the first branch line is opened through an operation of the first valve and the second connection line is opened in a state in which the battery cooling line connected to the battery module is closed through an operation of the fourth valve, the first connection line is closed and the cooling line connecting the electric component and the condenser to each other is opened, through operations of the second and third valves, the connection between the cooling line and the battery cooling line is closed through operations of the first to third valves, the cooling line connecting the electric component and the radiator to each other is opened in a state in which the second branch line is closed through an operation of the fifth valve, the third branch line is closed through the operation of the sixth valve, the first and second battery heating lines are closed through the seventh and eighth valves, and the refrigerant is circulated in the CE module.

4. The heat pump system for the vehicle of claim 3, wherein:

the evaporator cools the coolant circulated along the battery cooling line in the cooling mode of the vehicle with a low-temperature refrigerant evaporated therein through a heat exchange and supplies a low-temperature coolant to the cooler through the second connection line.

5. The heat pump system for the vehicle of claim 3, wherein:

in a case cooling the battery module along with the electric component in the cooling mode of the vehicle, the battery cooling line connected to the battery module is opened through the operation of the fourth valve, and the first and second battery heating line is closed through the operation of the seventh valve and the eighth valve.

6. The heat pump system for the vehicle of claim 3, wherein:

in a case increasing a temperature of the battery module in the cooling mode of the vehicle, the cooling line connecting the electric component and the condenser to each other and the first connection line are opened through operations of the second and third valves, the first and second battery heating lines are opened through the operation of the seventh and eighth valves, and the battery cooling line connected to the battery module is connected to the first connection line through the opened first and second battery heating lines.

7. The heat pump system for the vehicle of claim 1, wherein:

in a case recovering a waste heat of the battery module and the electric component in a heating mode of the vehicle, the first branch line is closed through an operation of the first valve and the second connection line is closed in a state in which the battery cooling line connected to the battery module is opened through an operation of the fourth valve, the cooling line connecting the electric component and the condenser to each other and the first connection line are opened through operations of the second and third valves, the cooling line is connected to the battery cooling line through operations of the first to third valves, the cooling line connecting the electric component and the radiator to each other is closed in a state in which the second branch line is opened through an operation of the fifth valve, the third branch line is closed through the operation of the sixth valve, the first and second battery heating lines are closed through the operation of the seventh valve and the eighth valve, and the refrigerant is circulated in the CE module.

8. The heat pump system for the vehicle of claim 7, wherein:
the waste heat generated in the electric component and the battery module raises a temperature of a coolant circulated along the cooling line and the battery cooling line, and the coolant of which the temperature is raised raises a temperature of a refrigerant exhausted from the evaporator.

9. The heat pump system for the vehicle of claim 7, wherein:
in the case of recovering the waste heat from only the battery module in the heating mode of the vehicle,
the first branch line is opened through an operation of the first valve, and the connection between the cooling line and the battery cooling line is closed through operations of the first to third valves.

10. The heat pump system for the vehicle of claim 1, wherein:
in a case increasing a temperature of the battery module in a heating mode of the vehicle,
the first branch line is closed through the operation of the first valve, and the battery cooling line connected to the battery module and the second connection line are closed through the operation of the fourth valve,
the cooling line and the first connection line connecting the electric component, and the condenser and the sub condenser are opened through the operation of the second and third valves,
the cooling line is connected to the battery cooling line through the operation of the first, second, and third valves,
the cooling line connecting the electric component and the radiator are closed in a state that the second branch line is opened through the operation of the fifth valve,
the third branch line is opened through the operation of the sixth valve such that the cooling line and the battery cooling line are connected,
the refrigerant is circulated in the CE module,
the first and second battery heating lines are opened through the operation of the seventh and eighth valves, and
the battery cooling line connected to the battery module is connected to the first connection line through the opened first and second battery heating lines.

11. The heat pump system for the vehicle of claim 1, wherein:
in a heating and dehumidifying mode of the vehicle, the first branch line is opened through an operation of the first valve and the second connection line is opened in a state in which the battery cooling line connected to the battery module is closed through an operation of the fourth valve, the cooling line connecting the electric component and the condenser to each other and the first connection line are opened through operations of the second and third valves, the connection of the cooling line connected to the electric component and the battery cooling line is closed through the operation of the first, second and third valves in a state that the operation of the first water pump is stopped, the second and third branch lines are closed through the operation of the fifth and sixth valves, the first and second battery heating lines are closed through the operation of the seventh valve and the eighth valve, and the refrigerant is circulated in the CE module.

12. The heat pump system for the vehicle of claim 1, wherein:
in a case increasing the temperature of the battery module in a heating and dehumidifying mode of the vehicle,
the first branch line is opened through an operation of the first valve and the second connection line is opened in a state in which the battery cooling line connected to the battery module is closed through an operation of the fourth valve,
the cooling line and the first connection line connecting the condenser and the sub condenser are opened through the operation of the second and third valves,
the connection of the cooling line connected to the electric component and the battery cooling line are closed through the operation of the first, second and third valves in a state that the operation of the first water pump is stopped,
the second and third branch lines are closed through the operation of the fifth and sixth valves,
the first and second battery heating lines are opened through the operation of the seventh and eighth valves,
the battery cooling line connected to the battery module is connected to the first connection line through the opened first and second battery heating line, and
the refrigerant is circulated in the CE module.

13. The heat pump system for the vehicle of claim 1, wherein:
in a case increasing a temperature of the battery module in a state that a cooling or heating mode of the vehicle,
the circulation of the refrigerant is stopped in the CE module,
the first branch line is connected to the battery cooling line and the connection with the cooling line is closed through operation of the first valve,
the battery cooling line passing through the battery module is opened through the operation of the fourth valve,
the second and third branch lines are closed through the operation of the fifth and sixth valves, and
the first and second battery heating lines are closed through the operation of the seventh valve and the eighth valve.

14. The heat pump system for the vehicle of claim 1, wherein:
a heater is provided in the battery cooling line between the battery module and the evaporator, and the heater is operated to be turned on so that the coolant circulated along the battery cooling line is heated to be introduced to the battery module.

15. The heat pump system for the vehicle of claim 1, wherein:
a reservoir tank connected to the second branch line is provided between the radiator and the first water pump.

16. The heat pump system for the vehicle of claim 1, wherein:
the condenser, the sub condenser, and the evaporator are a water cooling type heat exchanger in which the coolant is introduced inside through the cooling line and the battery cooling line.

17. The heat pump system for the vehicle of claim 1, wherein:
the refrigerant circulated in the CE module is a R152-a or R744 refrigerant.

18. The heat pump system for the vehicle of claim 1, wherein:
a second water pump is provided in the battery cooling line, and a third water pump is provided in the first connection line.

19. The heat pump system for the vehicle of claim 1, wherein:
the electric component is a motor, an electric power control unit (EPCU) and on board charger (OBC),
the motor and the electric power control unit are heated while driving, and the on board charger is heated while charging the battery module.

20. The heat pump system for the vehicle of claim 1, wherein:
the second and third valves are a 4-way valve,
the first, fourth, fifth, sixth and seventh valves are a 3-way valve, and
the eighth valve is a 2-way valve.

* * * * *